United States Patent Office 2,785,699
Patented Mar. 19, 1957

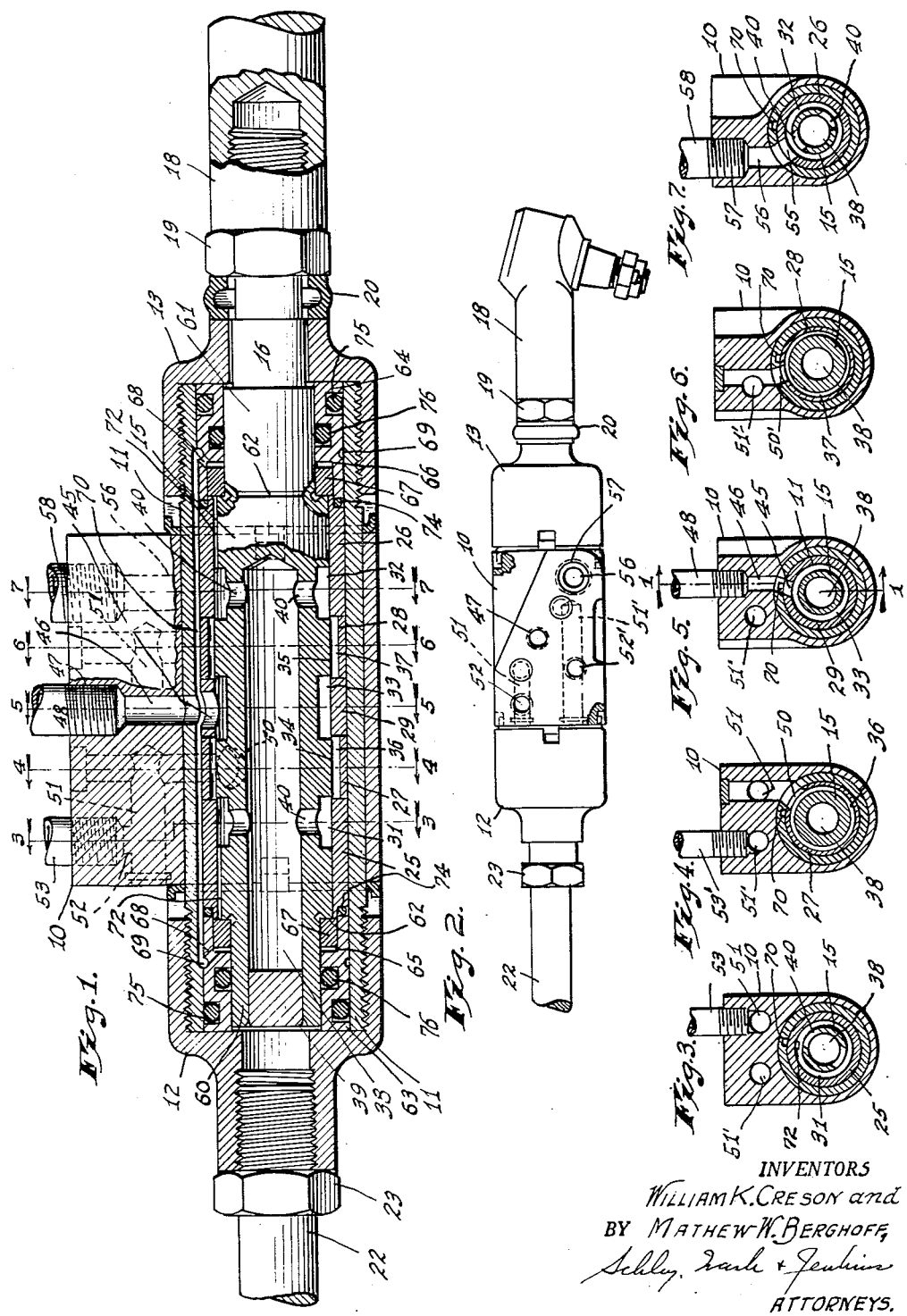

2,785,699

VALVE

William K. Creson and Mathew W. Berghoff, Lafayette, Ind., assignors to Ross Gear & Tool Company, Lafayette, Ind., a corporation of Indiana Application March 18, 1952, Serial No. 277,142

3 Claims. (Cl. 137—622)

This invention relates to slide valves suitable for use in controlling the operation of reversible hydraulic motors and is especially advantageous when incorporated in a valve of the "open center" type in which pressure fluid flows continuously through the valve. When such a valve is in neutral position, pressure fluid from a pump enters at an inlet port and divides into two streams flowing longitudinally of the valve. Each stream flows past a motor port to an exhaust port for return to the pump. In passing from the inlet port to an exhaust port, each fluid-stream within the valve traverses a path defined by annular grooves and annular lands on inner and outer valve members which can be moved axially relative to each other to vary the restriction imposed on fluid flow from the inlet port to the motor port and from the motor port to the exhaust port.

Valves of the type described are extremely sensitive, only a slight relative movement of the inner and outer valve members being required to cause actuation of the motor which the valve controls. It is accordingly essential that the lands and grooves on the two members be accurately formed and accurately located. For practical reasons, the outer member usually has a length equal to several times its internal diameter; and the accurate formation of accurately located lands and grooves on the inner surface of the outer valve member therefore involves considerable difficulty.

It is an object of this invention to facilitate the manufacture of slide valves and particularly to facilitate the manufacture of the outer of two telescoping slide-valve members. A further object of the invention is to facilitate the manufacture of a valve in which the two relatively movable valve members are biased toward their neutral position by hydraulic pressure.

In carrying out the invention in its preferred form we employ a valve block provided with an elongated cylindrical opening in which a tubular valve sleeve is located; and within such valve sleeve we provide a liner constituting the outer valve member. In accordance with the principal feature of this invention, the valve liner is sectional, being made up of a number of annular elements or rings having an external diameter substantially equal to the internal diameter of the valve sleeve but having different internal diameters. The rings of smaller internal diameter constitute the lands of the outer valve member, while the rings of larger internal diameter define in the outer valve member annular chambers through which the pressure fluid flows. The inner valve member is conveniently formed in conventional manner, of a single piece of stock machined to provide the necessary lands and grooves.

If the valve is of the type in which hydraulic pressure is employed to bias the two valve members to their relative neutral position, the means for accomplishing such biasing action may include pressure chambers located near the opposite ends of the valve liner and communicating with the valve inlet through a longitudinally extending groove formed in the inner surface of the valve sleeve.

The accompanying drawing illustrates the invention: Fig. 1 is an elevation of the valve mechanism in partial section on the line 1—1 of Fig. 5; Fig. 2 is a plan view of the valve mechanism; and Figs. 3 to 7 inclusive are transverse sections, respectively, on the correspondingly numbered section lines in Fig. 1.

The device illustrated in the drawing is a two-part drag link designed for incorporation in the steering mechanism of a power-steered vehicle. Such an arrangement, which is shown here merely by way of example, is of a type more fully illustrated and described in the co-pending application of Robert A. Garrison, Serial No. 134,490, filed December 22, 1949. The valve mechanism illustrated is operated by relative movement of the two parts of the drag link and serves to control the operation of a hydraulic motor capable of assisting in steering a vehicle. It is to be noted, however, that the present invention has uses in situations other than that illustrated.

The valve mechanism shown comprises a valve body 10 provided with a hole for the reception of a tubular valve sleeve 11 the ends of which project beyond the block and are externally screw-threaded for the reception of a reducer 12 and a cap 13, respectively. Within the sleeve 11 there is a sectional liner to be described in detail later, and within such liner is an axially slidable inner valve member or spool 15 having a stem or shank 16 projecting outwardly through a central opening in the cap 13 and externally screw-threaded for attachment to one member 18 of the two-part drag link previously referred to. A jam nut 19 locks the spool 15 and the member 18 together, and an axially compressible sealing collar 20 located between the jam nut 19 and the end of the cap 13 seals the valve mechanism against the entrance of dirt or other foreign matter around the stem 16. The other member 22 of the two-part drag link is screw-threadedly received in the outer end of the reducer 12, to which it is locked by a jam nut 23.

The sectional valve liner previously referred to is shown as comprising five annular elements or rings— namely, two end rings 25 and 26, two intermediate rings 27 and 28, and a central ring 29. All these rings have the same external diameter so that they will fit within the sleeve 11. The end rings 25 and 26 and the center ring 29 have the same internal diameter. The intermediate rings 27 and 28, one of which is located between each end ring and the center ring, have internal diameters equal to each other but larger than the internal diameter of the end and center rings.

The inner valve member or spool 15 has within the sectional valve liner an external diameter equal substantially to the internal diameter of the end and center rings of such sectional liner so that the spool may slide axially within the liner. The spool is machined to provide on its exterior surface two end grooves 31 and 32 and a central groove 33. The grooves 31 and 32 define between them a land 34, while the grooves 32 and 33 define a second land 35.

The inner and outer valve members are shown in Fig. 1 in the relative position they occupy when the valve is in its neutral condition. As there shown, the central groove 33 in the spool 15 lies opposite the central ring 29 of the liner, the lands 34 and 35 of the spool respectively lie opposite the intermediate rings 27 and 28 of the liner, and the inner ends of the outer rings 25 and 26 overlie the end grooves 31 and 32 of the spool. The axial extent of the groove 33 is slightly greater than the axial extent of the central ring 29, and the axial extent of each of the spool-lands 34 and 35 is somewhat less than that of the intermediate rings 27 and 28 opposite which they lie. As a result, when the valve is in its neutral position, the groove 33 communicates with the grooves 31 and 32 through the annular chambers 36 and 37 defined respectively by the land 34 and ring 27 and by the land 35 and ring 28.

The two grooves 31 and 32 in the inner valve member 15 communicate with each other through a central passage 38 formed by an axial hole drilled into such member from one end thereof and having its outer end subsequently closed by a sealing plug 39. Radial holes 40 drilled in the spool interconnect the central spool-passage 38 with each of the grooves 31 and 32.

The conduits through which fluid flows from the pump to the valve, between the valve and the motor, and from the valve for return to the pump are connected to the valve block 10 and communicate with the annular grooves and chambers within the valve through passages and ports formed in the valve block 10, sleeve 11, and sectional valve liner. In the construction illustrated, aligned ports 45 in the sleeve 11 and central ring 29, and a passage 46 in the valve body, provide communication between the groove 33 and an inlet opening 47 adapted to receive a supply conduit 48 extending from the pump. Aligned ports 50 in the sleeve 11 and ring 27, and a passage 51 in the valve body, interconnect the annular chamber 36 with an opening 52 in the valve body 10, while similar ports 50' and a passage 51' provide communication between the annular chamber 37 and an opening 52'. The openings 52 and 52' are adapted to receive conduits 53 and 53' extending to the motor which is to be controlled by the valve. The grooves 31 and 32 intercommunicate through the central passage 38 and ports 40 in the inner valve member 15, while ports 55 in the sleeve 11 and ring 26, and a passage 56 in the valve body, connect the groove 32 with an opening 57 adapted to receive a return conduit 58 through which fluid flows for return to the pump. The showings of the conduits 48, 53, 53' and 58 in Figs. 3, 4, 5 and 7 are to be considered diagrammatic; for, with the valve embodied in a drag link in the manner shown, those conduits must be flexible, or must at least include flexible sections.

The mode of operation of valves of the type shown is well known, but will be briefly described. Each land 34 or 35 has an axial extent less than that of its associated chamber 36 or 37 so that, when the inner valve member 15 is in its neutral position, the groove 33 communicates with both of the end grooves 31 and 32. As a result, fluid under pressure supplied to the groove 33 through the passage 46 and ports 45 divides into two streams, one flowing axially through the chamber 37 to the groove 32 and the other flowing through the chamber 36, groove 31, ports 40, and central passage 38 to the groove 32. From the groove 32, the fluid flows through ports 55, passage 56, and conduit 58 for return to the pump.

With the valve in its neutral condition, the pressures in the chambers 36 and 37 are effectively balanced, and there is therefore no flow of fluid to or from the motor, which is connected between those chambers. Upon displacement of the inner valve member from neutral position, however, pressures in the chambers become unbalanced, and fluid flows to the motor from the chamber of higher pressure and returns from the motor to the chamber of lower pressure.

From the above description of operation, it will be obvious that comparatively small movements of the inner valve member will affect operation of the motor and that the co-operating parts of the valve liner and inner valve member must accordingly be accurately dimensioned. By making the valve liner in the form of a plurality of ring-like sections, it is possible to finish those sections to length before they are inserted in the sleeve 11, and it is therefore a simple matter to control accurately the lengths and relative axial disposition of the chambers 36 and 37. In assembling the valve, it is convenient to employ shrink fits. In the preferred manner of construction, the sleeve 11 is heated before assembly and then shrunk upon the valve-liner sections 25, 26, 27, 28, 29, such sections, as they are inserted into the sleeve, being forced together axially and so oriented that the several pairs of ports 45, 50, 50', and 55 will be properly aligned. When the parts have attained equality of temperature, the sections will be firmly held in place in sleeve 11. Then valve body 10 is heated and shrunk upon the sleeve 11, the sleeve being positioned to bring its ports into respective alignment with the passages in the valve body. When equality of temperature is attained, the sleeve 11 is firmly held in the body 10. Then the sections 25, 26, 29, which are desirably hardened, are given a final finishing operation. Since the liner-sections 27 and 28 are not subject to wear, they need not be hardened or subjected to an internal finishing operation after insertion.

In the particular valve illustrated in the drawing, fluid pressure is utilized to oppose displacement of the inner valve member from its neutral position. For this purpose, the ends of the valve member are reduced in diameter as indicated at 60 and 61 to provide outwardly presented shoulders 62 and to be slidably received in annular glands 63 and 64 located within the sleeve 11 at the opposite ends thereof and held in place by the reducer 12 and cap 13. The inner ends of the glands 63 and 64 are counterbored to provide pressure chambers 65 and 66 each of which slidably receives an annular piston 67. Ports 68 in the outer ends of the pressure chambers communicate respectively with annular grooves 69 in the outer surfaces of the glands 63 and 64, and such annular grooves in turn communicate with the valve-inlet through portions of a common groove 70 formed in the inner face of the sleeve 11 and extending axially thereof in the plane of the ports 45.

Fluid pressure in the chambers 65, 66 forces the pistons 67 inwardly toward engagement with the shoulders 62 and the adjacent ends of the sectional valve liner. If, as is the case when the valve is in neutral condition, the pistons engage both shoulders 62 of both ends of the liner, fluid pressure in the chambers 65, 66 has no effect in tending to move the inner valve member 15. Upon displacement of the valve member 15 toward either end of the sleeve 11, however, the piston 67 in the chamber at that end of the sleeve will be engaged and forced outwardly by the adjacent shoulder 62. The other piston will not follow in the movement of the valve member 15, because it will engage the adjacent end of the valve liner. Accordingly, movement of the valve member 15 from neutral position will be opposed by the effort required to displace fluid from the one chamber (65 or 66) through the groove 70 against the pressure existing at the valve inlet. Until the force acting between the two drag-link parts 18 and 22 becomes great enough to overcome the effort referred to, no movement of the inner valve member 15 will take place; and if displacement of the member 15 does occur, an unbalanced hydraulic pressure transmitted through the one piston 67 and the associated shoulder 62 will continue to urge the member toward its neutral position. The prior application above referred to discloses a valve in which the inner valve member is urged toward neutral position by means including annular pistons operating in pressure chambers located near the ends of the valve, but the means employed for supplying fluid under pressure to those chambers is different from that which we employ.

To provide for the escape of any fluid leaking past the annular pistons, the inner valve member may be provided with axially extending grooves 72 of small cross-section respectively extending from the outer annular grooves 31 and 32 to the adjacent shoulders 62. The inner ends of the chambers 65 and 66 are sealed against the entrance of pressure fluid as by O-rings 74 located in annular grooves in the outer ends of the sectional sleeve liner. Additional O-ring seals 75 and 76 are shown in annular grooves in the glands 63 and 64 for preventing leakage along the inner surface of the sleeve 11 and along the reduced end portions 60 and 61 of the inner valve member.

We claim as our invention:

1. In a slide valve having inner and outer valve members relatively movable in opposite axial directions from a neutral position, hydraulic centering means including pressure chambers located within the outer valve member near opposite ends thereof for opposing relative movement of the valve members from neutral position, and a liner fitting within the outer valve member extending axially therein between said chambers, the outer member and liner having an inlet passageway located between said chambers, the outer member being provided on its inner surface with a groove intersecting said passageway, extending axially therefrom, and communicating with said chambers.

2. In a slide valve having inner and outer members relatively movable axially from a neutral position, hydraulic means including a pressure chamber within the outer valve member for opposing relative movement of the valve members from neutral position, and a liner fitting within the outer valve member and extending axially thereof from said chamber, the outer member and liner having an inlet passageway displaced axially of the valve from said chamber, the outer member being provided on its inner surface with an axially extending groove providing communication between said passageway and chamber.

3. In a slide valve having inner and outer members relatively movable axially from a neutral position, hydraulic means including a pressure chamber within the outer valve member for opposing relative movement of the valve members from neutral position, and a liner for said outer valve member, said liner and outer valve member having contacting cylindrical surfaces, an inlet passageway in said liner and outer valve member spaced axially from said chamber, one of said contacting cylindrical surfaces being provided with an axially extending groove intersecting said passageway and communicating with said chamber.

References Cited in the file of this patent

UNITED STATES PATENTS

| | | |
|---|---|---|
| 1,751,098 | Orton | Mar. 18, 1930 |
| 1,951,963 | Burke | Mar. 20, 1934 |
| 2,157,240 | Keel | May 9, 1939 |
| 2,365,075 | Hassman | Dec. 12, 1944 |
| 2,369,505 | Ward | Feb. 13, 1945 |
| 2,410,404 | Buchanan | Nov. 5, 1946 |
| 2,624,585 | Churchill | Jan. 6, 1953 |

FOREIGN PATENTS

| | | |
|---|---|---|
| 569,829 | Great Britain | Nov. 6, 1944 |
| 651,849 | Great Britain | of 1951 |